(12) United States Patent
McMullen et al.

(10) Patent No.: US 10,840,788 B2
(45) Date of Patent: Nov. 17, 2020

(54) CONTROLLING MULTIPLE ELECTRIC STATORS

(71) Applicant: Upwing Energy, LLC, Cerritos, CA (US)

(72) Inventors: Patrick McMullen, Villa Park, CA (US); Herman Artinian, Huntington Beach, CA (US); Kuo-Chiang Chen, Kennedale, TX (US); Liping Zheng, Buena Park, CA (US)

(73) Assignee: Upwing Energy, LLC, Cerritos, CA (US)

( * ) Notice: Subject to any disclaimer, the term of this patent is extended or adjusted under 35 U.S.C. 154(b) by 162 days.

(21) Appl. No.: 15/857,476

(22) Filed: Dec. 28, 2017

(65) Prior Publication Data

US 2019/0207493 A1   Jul. 4, 2019

(51) Int. Cl.
*H02K 21/16* (2006.01)
*H02K 3/28* (2006.01)
*H02K 1/14* (2006.01)
*E21B 4/00* (2006.01)
*H02K 1/08* (2006.01)
*E21B 4/04* (2006.01)
*H02K 3/18* (2006.01)
(Continued)

(52) U.S. Cl.
CPC ............. *H02K 21/16* (2013.01); *E21B 4/003* (2013.01); *E21B 4/04* (2013.01); *H02K 1/08* (2013.01); *H02K 1/145* (2013.01); *H02K 1/278* (2013.01); *H02K 3/18* (2013.01); *H02K 3/28* (2013.01); *H02K 5/1285* (2013.01); *H02K 5/132* (2013.01); *H02K 11/33* (2016.01); *H02K 16/00* (2013.01); *H02K 21/14* (2013.01); *H02P 1/00* (2013.01)

(58) Field of Classification Search
CPC ........ H02K 21/16; H02K 21/14; H02K 16/00; H02K 11/33; H02K 3/18; H02K 3/28; H02K 1/08; H02K 1/145; H02K 1/278; E21B 4/003; E21B 4/04; H02P 1/00
USPC ............................ 310/68 C, 112–114, 85–87
See application file for complete search history.

(56) References Cited

U.S. PATENT DOCUMENTS

| 6,388,353 B1 * | 5/2002 | Liu ......................... F04B 13/00 310/114 |
| 2006/0037743 A1 * | 2/2006 | Head .................... H02K 5/1285 166/66.4 |

(Continued)

FOREIGN PATENT DOCUMENTS

GB          2501352         11/2017

*Primary Examiner* — Michael Andrews
(74) *Attorney, Agent, or Firm* — Fish & Richardson P.C.

(57) ABSTRACT

A first electric stator surrounds a first electric rotor and is configured to cause the first electric rotor to rotate or generate electricity in the first electric stator when the first electric rotor rotates. The first electric stator includes a first set of electric windings. A second electric stator surrounds the second electric rotor and is configured to cause the second electric rotor to rotate or generate electricity in the second electric stator when the second electric rotor rotates. The second electric stator includes a second set of electric windings. The second electric stator is electrically coupled to the first electric stator. A controller is electrically coupled to both the first electric stator and the second electric stator. The controller is configured to exchange an electric current with a combination of the first electric stator and the second electric stator.

30 Claims, 5 Drawing Sheets

(51) Int. Cl.
*H02K 1/27* (2006.01)
*H02K 21/14* (2006.01)
*H02P 1/00* (2006.01)
*H02K 11/33* (2016.01)
*H02K 5/128* (2006.01)
*H02K 5/132* (2006.01)
*H02K 16/00* (2006.01)

(56) References Cited

U.S. PATENT DOCUMENTS

| | | | |
|---|---|---|---|
| 2008/0284268 A1* | 11/2008 | Yuratich | H02K 1/278 |
| | | | 310/156.09 |
| 2011/0297391 A1* | 12/2011 | Fielder | H02K 5/132 |
| | | | 166/369 |
| 2014/0127056 A1* | 5/2014 | Wang | F04C 23/02 |
| | | | 417/410.5 |
| 2015/0114632 A1 | 4/2015 | Romer et al. | |
| 2016/0312690 A1* | 10/2016 | Smiljanovski | F04D 25/0606 |
| 2018/0171767 A1* | 6/2018 | Huynh | E21B 43/128 |
| 2018/0180055 A1* | 6/2018 | McMullen | E21B 43/121 |

* cited by examiner

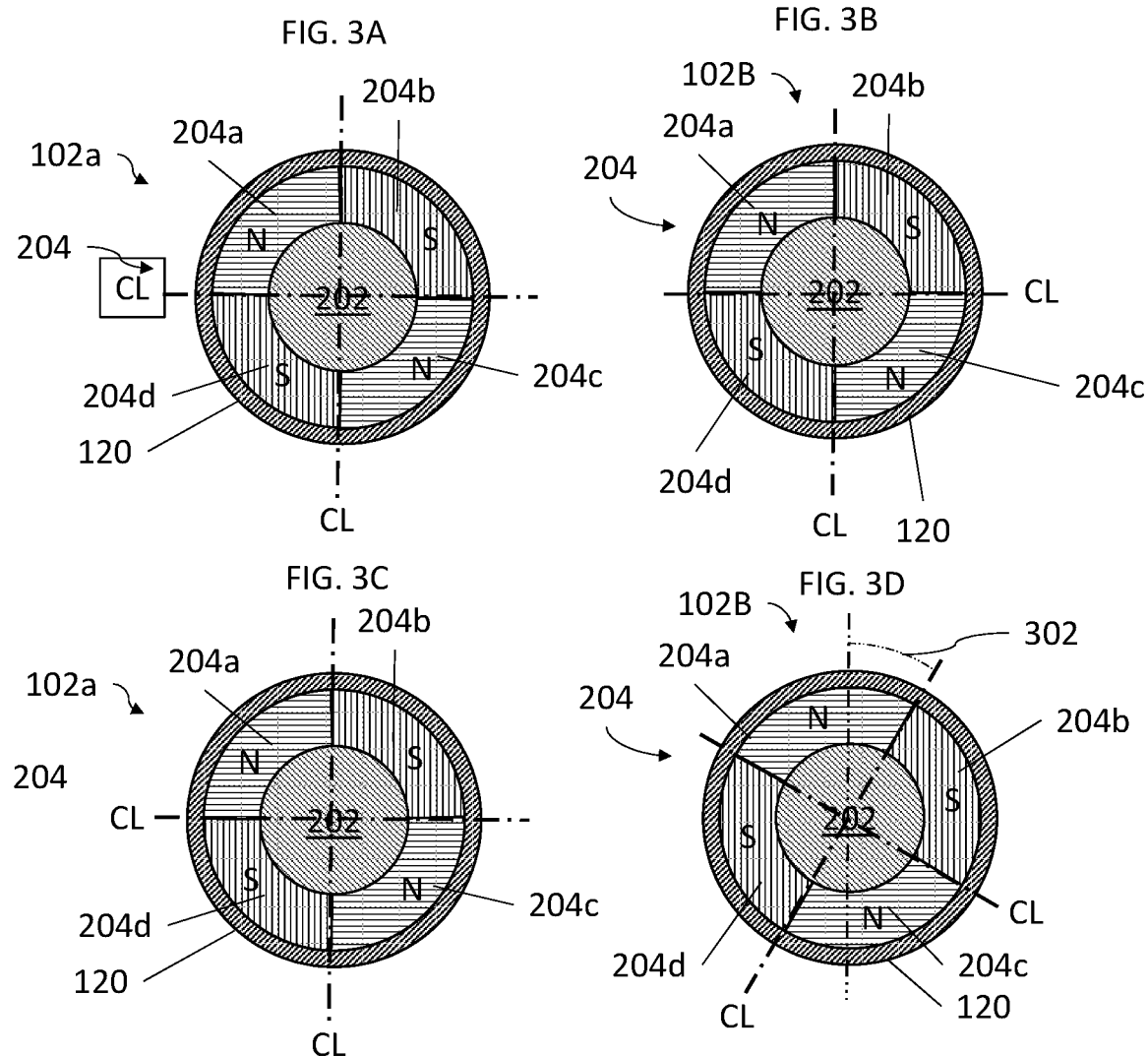

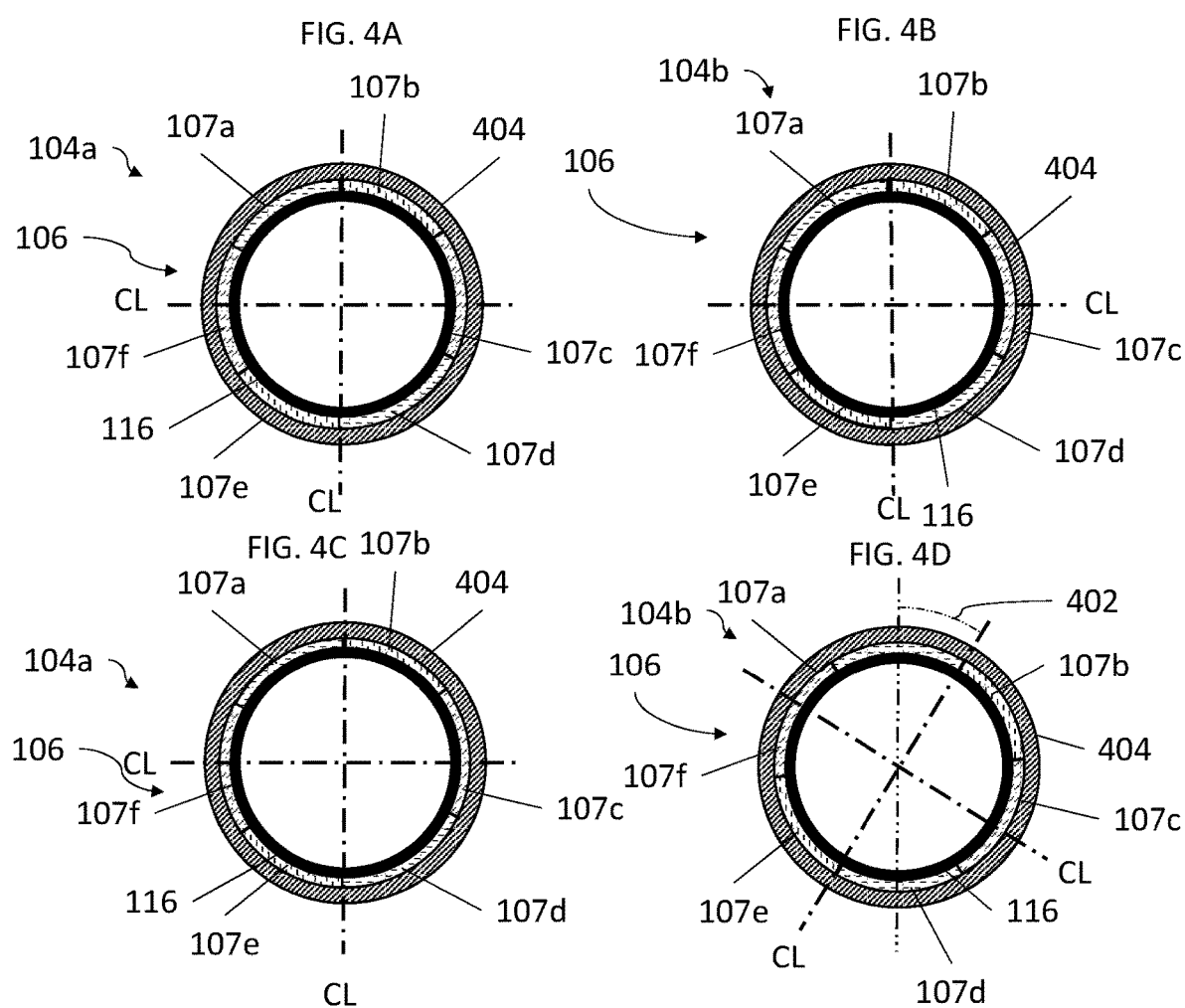

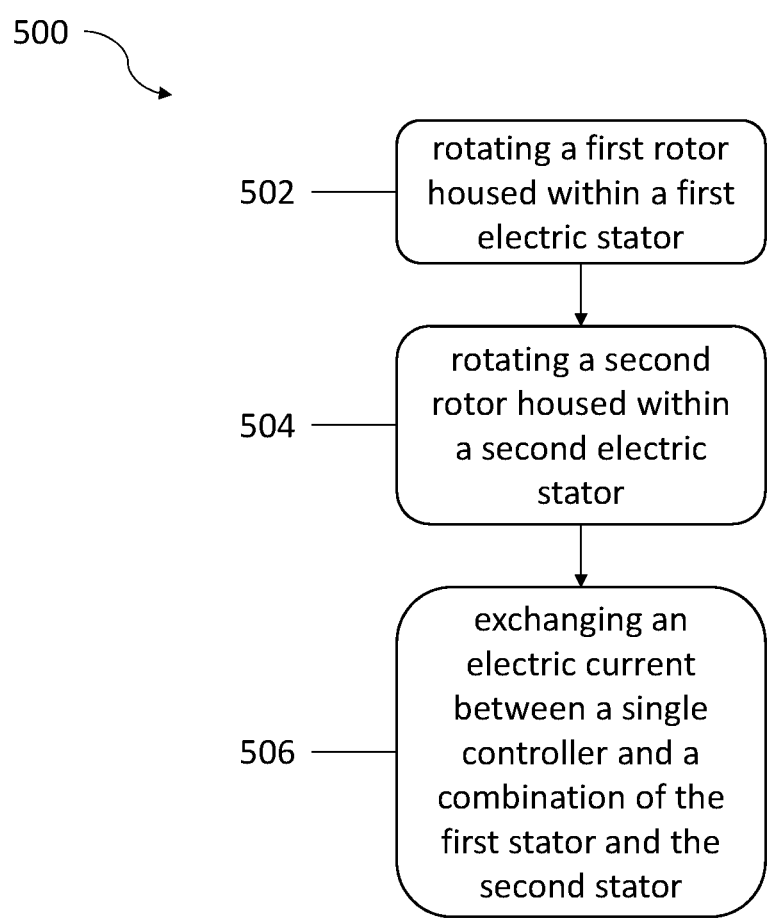

CONTROLLING MULTIPLE ELECTRIC STATORS

TECHNICAL FIELD

This disclosure relates to electric machines, such as motors and generators.

BACKGROUND

In applications where an outer diameter is constrained, such as in downhole applications, electric machines (for example, motors, generators) are often lengthened to provide a specified power requirement. In some instances, a single long stator and a single long rotor are used to account for the restriction in diameter. In other instances, electric machines are strung together in series with multiple rotors and multiple stators being controlled by multiple individual controllers, one controller per stator.

SUMMARY

This disclosure describes technologies relating to controlling multiple electric stators.

An example implementation of the subject matter described within this disclosure is an electric machine with the following features. A first electric stator surrounds a first electric rotor and is configured to cause the first electric rotor to rotate or generate electricity in the first electric stator when the first electric rotor rotates. The first electric stator includes a first set of electric windings. A second electric rotor is rotatably coupled to an end of the first electric rotor. A second electric stator surrounds the second electric rotor and is configured to cause the second electric rotor to rotate or generate electricity in the second electric stator when the second electric rotor rotates. The second electric stator includes a second set of electric windings. The second electric stator is electrically coupled to the first electric stator. A controller is electrically coupled to both the first electric stator and the second electric stator. The controller is configured to exchange an electric current with a combination of the first electric stator and the second electric stator.

Aspects of the example implementation, which can be combined with the example implementation alone or in combination, include the following. A coupling used to rotatably couple the first electric rotor and the second electric rotor includes a spline coupling.

Aspects of the example implementation, which can be combined with the example implementation alone or in combination, include the following. The controller includes a variable speed drive or a variable speed rectification system.

Aspects of the example implementation, which can be combined with the example implementation alone or in combination, include the following. The first rotor and the second rotor include permanent magnets rotors.

Aspects of the example implementation, which can be combined with the example implementation alone or in combination, include the following. The first rotor and the second rotor are configured so that a magnetic field of the first rotor is out-of-phase with a magnetic field of the second rotor.

Aspects of the example implementation, which can be combined with the example implementation alone or in combination, include the following. The first rotor and the second rotor are configured so that a magnetic field of the first rotor is in-phase with a magnetic field of the second rotor.

Aspects of the example implementation, which can be combined with the example implementation alone or in combination, include the following. The first electric stator and the second electric stator are configured to be out-of-phase with one another.

Aspects of the example implementation, which can be combined with the example implementation alone or in combination, include the following. The first electric stator and the second electric stator are configured to be in-phase with one another.

Aspects of the example implementation, which can be combined with the example implementation alone or in combination, include the following. The electric machine is a downhole-type electric machine.

Aspects of the example implementation, which can be combined with the example implementation alone or in combination, include the following. The first electric stator and the second electric stator include a sealing element configured to isolate the stator from an outside environment.

Aspects of the example implementation, which can be combined with the example implementation alone or in combination, include the following. A radial bearing is positioned at an interface between the first electric stator and the second electric stator. The radial bearing is configured to support the first rotor and the second rotor.

Aspects of the example implementation, which can be combined with the example implementation alone or in combination, include the following. The radial bearing includes a magnetic radial bearing.

Aspects of the example implementation, which can be combined with the example implementation alone or in combination, include the following. The radial bearing includes two separate radial bearings, a first radial bearing supporting the first rotor and the second radial bearing supporting the second rotor.

An example implementation of the subject matter described within this disclosure is a method with the following features. A first rotor housed within a first electric stator is rotated. A second rotor housed within a second electric stator is rotated. An end of the second rotor is mechanically coupled to an end of the first rotor. The second stator is electrically coupled to the first electric stator. An electric current is exchanged between a single controller and a combination of the first stator and the second stator.

Aspects of the example implementation, which can be combined with the example implementation alone or in combination, include the following. The first electric stator and the second electric stator are isolated from an outside environment with a shield positioned at least along an inner circumference of the stator.

Aspects of the example implementation, which can be combined with the example implementation alone or in combination, include the following. An annular space is defined by an outer surface of the first rotor and the second rotor and an inner surface of the shield. The annular space is exposed to the outside environment.

Aspects of the example implementation, which can be combined with the example implementation alone or in combination, include the following. The first rotor and the second rotor are supported within the first electric stator and the second electric stator with a radial bearing.

Aspects of the example implementation, which can be combined with the example implementation alone or in combination, include the following. The radial bearing is exposed to the outside environment.

Aspects of the example implementation, which can be combined with the example implementation alone or in combination, include the following. The radial bearing includes a radial bearing rotor and a radial bearing stator. The radial bearing rotor is exposed to the outside environment.

An example implementation of the subject matter described within theis disclosure is an electric machine with the following features. A first electric stator surrounds a first electric rotor. The first electric rotor is configured to drive or be driven by the first electric stator. The first electric stator includes a first set of electric windings. A second electric rotor is rotatably configured to rotate in unison with the first electric rotor. A second electric stator surrounds the second electric rotor. The second electric stator includes a second set of electric windings. The second electric stator is electrically coupled to the first electric stator. The second electric rotor is configured to drive or be driven by the second electric stator. A controller is electrically coupled to both the first electric stator and the second electric stator. The controller is configured to exchange an electric current with a combination of the first electric stator and the second electric stator.

Aspects of the example implementation, which can be combined with the example implementation alone or in combination, include the following. The controller includes a variable speed drive or a variable speed rectification system.

Aspects of the example implementation, which can be combined with the example implementation alone or in combination, include the following. The first rotor and the second rotor include permanent magnets rotors.

Aspects of the example implementation, which can be combined with the example implementation alone or in combination, include the following. The first rotor and the second rotor are configured so that a magnetic field of the first rotor is configured to be out of phase with a magnetic field of the second rotor.

Aspects of the example implementation, which can be combined with the example implementation alone or in combination, include the following. The first electric stator and the first electric stator are in-phase with one another during operation.

Aspects of the example implementation, which can be combined with the example implementation alone or in combination, include the following. The electric machine is a downhole-type electric machine.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3D are lateral cross-sectional views of an example first and second electric machine rotor.

FIGS. 4A-4D are lateral cross-sectional views of an example first and second electric machine stator.

FIG. 5 is a flowchart of an example method that can be used with aspects of this disclosure.

Like reference numbers and designations in the various drawings indicate like elements.

DETAILED DESCRIPTION

Electric machines that use long rotors and long stators have a limited maximum speed due to the low critical speed of such a long, slender rotor. That is, high speed applications using long rotor/stator machines operate at a supercritical speed, complicating the rotodynamics of the machine. Electric machines that use multiple rotors with a single elongated stator, like electric submersible pump motors, do not often have the supercritical speed issue like the long rotor/stator solution has, but the stator construction is complicated, costly, and can suffer from manufacturing and reliability issues. Electric machines that use multiple rotors, stators, and controllers do not often have the supercritical speed issue like the long rotor/stator solution has, but the multiple controllers can have a considerable footprint that is not ideal in all applications, such as in an off-shore environment, and require interfacing hardware and software to allow controllers to efficiently and effectively work together to supply torque to a common shaft.

This disclosure describes an electric machine with at least two rotors and two stators. The stators are electrically coupled so they can be controlled by a single controller, while the rotors are mechanically coupled to rotate in unison. The coupling of the rotors is configured to vibrationally isolate each rotor from one another, so the series of rotors is able to stay sub-critical at high speeds. In some instances, the rotors are configured to be in phase with one another. In some instances, the stators are configured to be in phase with one another. In some instances, the rotors are configured to be out of phase with one another. In some instances, the stators are configured to be out of phase with one another. The out of phase implementations can be used to improve efficiency in some implementations, for example, when the shaft torsionally flexes during use.

Figure 1:
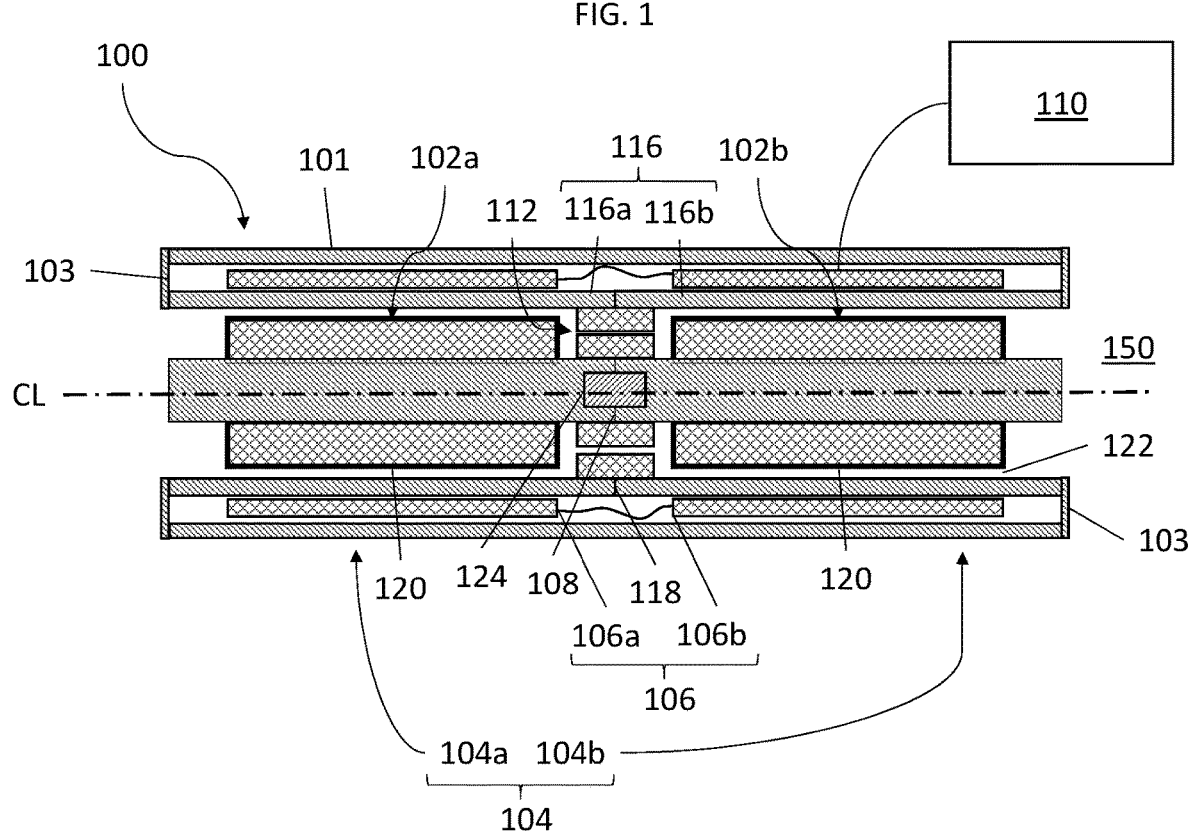
FIG. 1 is a half side cross-sectional view of an example electric machine.

FIG. 1 is an example electric machine 100 with a first electric rotor 102a surrounded by a first electric stator 104a. The first electric stator 104a is configured to cause the first electric rotor 102a to rotate, or to generate electricity within the first electric stator 104a when the first electric rotor 102a rotates. That is, the first electric rotor 102a is configured to drive or be driven by the first electric stator 104a. The first electric stator 104a includes a first set of electric windings 106a. the windings 106 are contained within a housing 101.

The electric machine also includes a second electric rotor 102b that is rotatably coupled to an end 108 of the first electric rotor 102a. That is, the second electric rotor 102b is configured to rotate in unison with the first electric rotor 102a. The second electric rotor 102b is configured to drive or be driven by the second electric stator 104b. The end of the first electric rotor 102a is mechanically coupled to an end of the second electric rotor 102b by any appropriate coupling 124. For example, a spline coupling where each end of the shaft has a female spline cut into it and a male to male spline is installed between to transmit torque while allowing for radial and axial misalignment and motion. While misalignment can vary with the specific coupling design and implementation, radial misalignment of less than 0.010 inches is typical. In some implementations, a radial bearing 112 can include a coupling 124. In some implementations the coupling 124, as in a male spline can be made part of one electric motor rotor, and a female spline can be made part of the second motor rotor. A second electric stator 104b surrounds the second electric rotor 102b and is configured to cause the second electric rotor 102b to rotate, or to generate electricity within the second electric stator 104b when the second electric rotor 102b rotates. The second electric stator 104b includes a second set of electric windings 106b. The second electric stator 104b is electrically coupled to the first electric stator 104a. That is, current is exchanged between both the first electric stator 102a and the second electric stator 102b. In other words, both stators exchange current with the same single controller 110.

A controller 110 is electrically coupled to both the first electric stator 104a and the second electric stator 104b. In some implementations, the controller 110 includes a variable speed drive or a variable speed rectification system. That is, the controller 110 can vary a speed, torque, or load on the electric machine 100 by varying an electrical frequency, voltage, current, or any combination thereof. The controller 110 and stators 104a and 104b can be wired to be connected in series, parallel, or a combination to achieve a desired result. The controller 110 is configured to exchange an electric current with a combination of the first electric stator 104a and the second electric stator 104b. That is, the controller 110 controls both the first stator 104a and the second stator 104b simultaneously The electric machine 100 also includes a radial bearing 112 positioned at an interface between the first electric stator 104a and the second electric stator 104b. The radial bearing is configured to at least partially radially support both the first rotor 102a and the second rotor 102b. The radial bearing 112 can include a magnetic radial bearing, a mechanical radial bearing or a combination. In instances where a magnetic radial bearing is used, the magnetic radial bearing can be a passive magnetic radial bearing or an active magnetic radial bearing. In instances where a magnetic bearing is used, a portion of the magnetic bearing can be isolated behind the shield 116 with the windings 106. In instances where a mechanical radial bearing is used, the mechanical radial bearing can include a fluid-film bearing or an anti-friction bearing. While the illustrated implementation shows a single radial bearing 112 being used, two separate radial bearings 112 can be used at the interface 118 without departing from this disclosure.

In some implementations, the electric machine can be exposed to an outside environment. That is, the interior surfaces of the electrical machine can be wetted. For example, in instances where the electric machine is used in a downhole environment, the interior of the electric machine can be exposed to reservoir fluids. That is, an annular space 122, defined by an outer surface of the first rotor 102a and the second rotor 102b and an inner surface of a shield 116, is exposed to an outside environment. In some instances, the radial bearing 112 is exposed to the outside environment. That is, the radial bearing 112 is unsealed, allowing fluid from an outside environment to flow through, or wet, the radial bearing 112. In some instances, the shield 116 can be connected to the housing 101 by endplates 103. In some implementations, the endplates 103 can be welded to the housing 101 and the shield 116 to provide isolation to the windings 106. In applications where the environment is considered acceptable to the motor stator operation, the shield 116 is not needed.

Additionally, in instances where the electric machine 100 is used in a downhole environment, the construction of the components of the electric machine 100 are configured to withstand the impacts, scraping, and other physical challenges the electric machine can encounter while being passed hundreds of feet/meters or even multiple miles/kilometers into and out of a wellbore. For example, the electric machine 100 can be disposed in a wellbore at a depth of up to 15,000 feet (4,572 meters). Beyond just a rugged exterior, this encompasses having certain portions of any electronics being ruggedized to be shock resistant and remain fluid tight during such physical challenges and during operation. Additionally, the electric machine is configured to withstand and operate for extended periods of time (e.g., multiple weeks, months, or years) at the pressures and temperatures experienced in a wellbore, which temperatures can exceed 400° F./205° C. and pressures over 2,000 pounds per square inch, and while submerged in the well fluids (gas, water, or oil, as examples). Finally, the electric machine can be configured to interface with one or more of the common deployment systems, such as jointed tubing (i.e., lengths of tubing joined end-to-end, threadingly and/or otherwise), a sucker rod, coiled tubing (i.e., not-jointed tubing, but rather a continuous, unbroken, and flexible tubing formed as a single piece of material), or wireline with an electrical conductor (i.e., a monofilament or multifilament wire rope with one or more electrical conductors, sometimes called e-line) and thus have a corresponding connector (e.g., positioning connector 728 discussed below, which can be a jointed tubing connector, coiled tubing connector, or wireline connector).

To protect the electrical components in the electric machine, the electronics can be "canned" or otherwise isolated from the wetting fluid. That is, a shield is positioned at least along an inner circumference of the stators 104. As illustrated, the first electric stator 104a and the second electric stator 104b include a first sealing element 114a and a second sealing element 116b, respectively. The first sealing element 116a and the second sealing element 116b are configured to isolate the stator from an outside environment 150. The stator sealing elements 116a and 116b act as a shield to protect and isolate windings 106. The stator sealing elements are welded or otherwise attached to the stators 104 to prevent process fluids from contacting the windings 106 and affecting performance. The sealing elements can be metallic, and nonmagnetic, but can also be made of a non-metallic material, such as Polyether ether ketone (PEEK) or ceramic. The first sealing element 116a and the second sealing element 116b are configured to maintain a seal at an interface 118 between the two sealing elements 116. The interface 118 can include a butt joint, lap joint, an any other type of interface that maintains fluid isolation of the windings 106. In some implementations, the interface 118 can be welded. In some implementations, the first rotor 102a and the second rotor 102b can also include a protective rotor casing 120 that shields vital rotor components from an outside environment.

When the electric machine 100 is in use, the first rotor 102a and the second rotor 102b are supported within the first electric stator 104a and the second electric stator 104b, respectively, with a radial bearing 112. The first rotor 102a housed within a first electric stator 104a is rotated. The second rotor 102b housed within the second electric stator 104b is rotated. An electric current is exchanged between a single controller 110 and a combination of the first stator 104a and the second stator 104b. In other words, the electric machine 100 can act as a generator and/or a motor depending upon the configuration of the controller 110.

Figure 2:
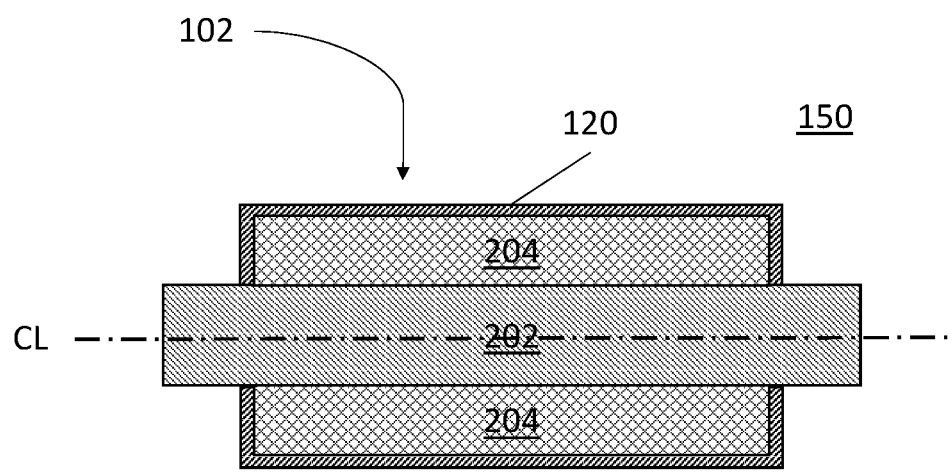
FIG. 2 is a half cross-sectional view of an example electric machine rotor.

FIG. 2 is a side, half-cross sectional diagram of an example rotor 102 that can be used as the first rotor 102a, the second rotor 102b, or both. The rotor 102 includes a central shaft 202. Surrounding the shaft 202 are one or more permanent magnets 204 that are arranged with alternating polarities around the central shaft 202. Surrounding the permanent magnets 204 along their inner circumference is the rotor casing 120. The rotor casing shields, protects, and otherwise isolates the permanent magnets from the outside environment 150. In addition, the rotor casing 120 retains the permanent magnets 204 to the shaft 202 during operations. That is, the rotor casing 120 is configured to contain the permanent magnets 204, counteracting the centrifugal force exerted by the magnets 204 while the rotor 102 rotates. While a permanent magnet rotor is described in detail within this disclosure, the subject matter described herein can be applied to other electric rotors, such as inductive rotors.

FIGS. 3A-3D are lateral cross-sectional diagrams of both the first electric rotor 102a and the second electric rotor 102b. Each rotor has several permanent magnets 204 around the central shaft 202. The magnets 204 are retained on the shaft 202 by the shield 116 that encircles the magnets 204. As illustrated, each rotor has four permanent magnets: a first permanent magnet 204a, a second permanent magnet 204b, a third permanent magnet 204c, and a fourth permanent magnet 204d. In the illustrated implementation, the permanent magnets are arranged around the shaft 202 so that the magnets 204 have alternating polarity. The first permanent magnet 204a and the third permanent magnet 204c have a first magnetic polarity, while the second permanent magnet 204b and the fourth permanent magnet 204c have a second magnetic polarity opposite of the first magnetic polarity. For example, the first permanent magnet 204a and the third permanent magnet 204c can have a "north" polarity, while the second permanent magnet 204b and the fourth permanent magnet 204d have a "south" polarity. That is, the first permanent magnet 204a and the third permanent magnet 204c can have a "north" pole of the magnet facing outward away from the shaft 202, while the second permanent magnet 204b and the fourth permanent magnet 204d have a "south" pole facing outward from the shaft 202. While the illustrated implementation shows a permanent magnet rotor with four permanent magnets, each permanent magnet can be made up of several, smaller magnets. In some implementations, as few as two alternating magnetic poles can be used, and/or more than four alternating magnetic poles can be use.

FIGS. 3A-3B show an implementation when both the first rotor 102a and the second rotor 102b are aligned to be in phase with one another. That is, the phasing of the magnets on each rotor are radially in-line with one-another. FIGS. 3C-3D show an implementation when both the first rotor 102a and the second rotor 102b are not aligned to be in phase with one another; the rotors are radially offset by an angle 302. That is, the phasing of the magnets on each rotor are not radially in-line with one-another. In other words, the rotors are out of phase with one-another. Purposefully having rotors out-of-phase with one another can improve performance in certain instances. For example, the rotors can be constructed such that an angle 302 is present at zero torque so that when the motors are under full torque and the coupling 124 angularly displaces under torsional load by the same angle as 302, the rotors will be in alignment. In another example, as the stators are driven by one controller in series a phase delay becomes present in the 3 phases of the windings of the first stator verses the second stator. The rotor angle 302 compensates for this phase delay to align the motor torque of each rotor. In some implementations, the rotors can be out of phase by 0° to 15° degrees.

FIGS. 4A-4D are lateral cross-sectional diagrams of both the first electric stator 104a and the second electric stator 104b. Each stator has several windings 106 housed within a stator housing 404. The windings 106 are protected and isolated by the shield 116 that covers an inner circumference of the windings 106. As illustrated, each stator has six windings: a first winding 107a, a second winding 107b, a third winding 107c, a fourth winding 107d, a fifth winding 107e, and a sixth winding 107f. In the illustrated implementation, the stator is a three-phase stator and windings 106 are arranged so that the windings 106 have alternating phases. The first winding 107a and the fourth winding 107d have a first electric phase, the second winding 107b and the fifth winding 107e have a second electrical phase, and the third winding 107c and the sixth winding 107f have a third electrical phase. While the illustrated implementation shows an electric stator with six windings (single pole three-phase electric stator), the subject matter described herein is applicable to other electric stators with any number of poles or phases, for example, a two-pole single phase electric machine.

FIGS. 4A-4B show an implementation when both the first stator 104a and the second stator 104b are aligned to be in phase with one another. That is, the phasing of the windings on each stator are radially in-line with one-another. FIGS. 4C-4D show an implementation when both the first stator 104a and the second stator 104b are not aligned to be in phase with one another. That is, the phasing of the windings on each stator are not radially in-line with one-another; the stators are radially offset by an angle 402. In other words, the stators are out of phase with one-another. Purposefully having stators out-of-phase with one another can improve efficiency in certain instances. For example, the stators can be constructed such that an angle 402 is present at zero torque so that when the motors are under full torque and the coupling 124 angularly displaces under torsional load by the same angle as 402, the rotors will be in alignment with their respective stators. In another example, as the stators are driven by one controller in series a phase delay becomes present in the 3 phases of the windings of the first stator verses the second stator. The stator angle 402 compensates for this phase delay to align the motor torque of each rotor. In some implementations, the stators can be out of phase by 0° to 15° degrees.

FIG. 5 is a flowchart of an example method 500 that can be used with aspects of this disclosure. At 502, a first rotor housed within a first electric stator is rotated. At 504, a second rotor housed within a second electric stator is rotated. An end of the second rotor is mechanically coupled to an end of the first rotor. The second stator is electrically coupled to the first electric stator. The first rotor and the second rotor are supported within the first electric stator and the second electric stator with a radial bearing. At 506, an electric current is exchanged between a single controller and a combination of the first stator and the second stator. In some instances, the first electric stator and the second electric stator are isolated from an outside environment with a shield positioned at least along an inner circumference of each stator. In some instances, an annular space, defined by an outer surface of the first rotor and the second rotor and an inner surface of the shield, is exposed to the outside environment. In some instances, the radial bearing is exposed to the outside environment.

While some examples of the subject matter have been disclosed, aspects of this disclosure can describe other implementations. For example, in some implementations, the multiple rotors can include a single, continuous rotor. In some implementations, more than two rotors and two stators can be used while driven by a single controller. While the illustrated examples included a single radial bearing within an interface for each stator, multiple radial bearings can be used to provide adequate levitation and support. In some implementations, a mechanical or active thrust bearing can be included. An active and/or passive damping system can be used on the passive magnetic radial bearings, the active magnetic thrust bearings, or both. In instances where a passive damping system is used, a highly electrically conductive metal plate, such as a copper plate, can be used. In such an instance, the movement of the rotor generates eddy currents on a copper plate. The eddy currents in turn generate a magnetic field that opposes the field in the rotor, resulting in a force applied to the rotor opposite that of the motion, reducing the motion. The faster and larger the motion, the larger the force generated on the plate in response to the motion. While a permanent magnet rotor was described in the context of the electric machine, an inductive rotor can be used to result in a similar effect. The electric machine described in this disclosure can be deployed in a downhole environment, such as a wellbore, an offshore environment, or in a land-based application.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

Thus, particular implementations of the subject matter have been described. Other implementations are within the scope of the following claims.

What is claimed is:

1. An electric machine comprising:
   a first electric rotor;
   a first electric stator surrounding the first electric rotor and configured to cause the first electric rotor to rotate or generate electricity in the first electric stator when the first electric rotor rotates, the first electric stator comprising a first set of electric multi-phase windings defining multiple electrical phases;
   a second electric rotor rotatably coupled to an end of the first electric rotor;
   a second electric stator surrounding the second electric rotor and configured to cause the second electric rotor to rotate or generate electricity in the second electric stator when the second electric rotor rotates, the second electric stator comprising a second set of multi-phase electric windings defining multiple electrical phases, the second electric stator being electrically coupled to the first electric stator; and
   a controller electrically coupled to both the first electric stator and the second electric stator, the controller configured to exchange an electric current with a combination of the first electric stator and the second electric stator,
   wherein the first electric stator and the second electric stator comprise a seal configured to isolate either the first electric stator or the second electric stator from an outside, downhole environment, and
   wherein an inner surface of the seal and an outer surface of the first electric rotor and the second electric rotor define an annulus exposed to the outside environment.

2. The electric machine of claim 1, wherein a coupling used to rotatably couple the first electric rotor and the second electric rotor comprises a spline coupling comprising longitudinal splines.

3. The electric machine of claim 1, wherein the controller comprises a variable speed drive or a variable speed rectification system.

4. The electric machine of claim 1, wherein the first electric rotor and the second electric rotor comprise permanent magnets rotors.

5. The electric machine of claim 4, wherein the first electric rotor and the second electric rotor are configured so that a magnetic field of the first electric rotor is angularly out-of-phase with a magnetic field of the second electric rotor.

6. The electric machine of claim 5, wherein the first electric rotor and the second electric rotor are up to 15 degrees angularly displaced from one another.

7. The electric machine of claim 5, wherein the first electric rotor and the second electric rotor are angularly displaced by an amount calculated based on an expected angular displacement under torsional load.

8. The electric machine of claim 4, wherein the first electric rotor and the second electric rotor are configured so that a magnetic field of the first electric rotor is angularly in-phase with a magnetic field of the second electric rotor.

9. The electric machine of claim 1, wherein the first electric stator and the second electric stator are configured to be angularly out-of-phase with one another.

10. The electric machine of claim 9, wherein the first electric stator and the second electric stator are up to 15 degrees angularly displaced from one another.

11. The electric machine of claim 9, wherein the first electric stator and the second electric stator are angularly displaced by an amount calculated based on an expected relative angular displacement of the electric rotors under torsional load.

12. The electric machine of claim 1, wherein the first electric stator and the second electric stator are configured to be angularly in-phase with one another.

13. The electric machine of claim 1, wherein the electric machine is a downhole-type electric machine.

14. The electric machine of claim 1, further comprising a radial bearing positioned at an interface between the first electric stator and the second electric stator, the radial bearing configured to support the first electric rotor and the second electric rotor.

15. The electric machine of claim 14, wherein the radial bearing comprises a magnetic radial bearing.

16. The electric machine of claim 14, wherein the radial bearing comprises two separate radial bearings, the first radial bearing supporting the first electric rotor and the second radial bearing supporting the second electric rotor.

17. A method of controlling the electric machine of claim 1 in a downhole environment, comprising:
   rotating the first rotor housed within the first electric stator;
   rotating the second rotor housed within the second electric stator, while an end of the second rotor is mechanically coupled to the end of the first rotor, and while the second stator is electrically coupled to the first electric stator; and
   exchanging an electric current between the controller and a combination of the first stator and the second stator.

18. The method of claim 17, further comprising isolating the first electric stator and the second electric stator from an outside environment with the seal positioned at least along an inner circumference of at least one of the stators.

19. The method of claim 18, further comprising exposing the annulus to the outside environment.

20. The method of claim 19, further comprising supporting the first rotor and the second rotor within the first electric stator and the second electric stator with a radial bearing.

21. The method of claim 20, further comprising exposing the radial bearing to the outside environment.

22. The method of claim 20, wherein the radial bearing comprises a radial bearing rotor and a radial bearing stator, the method further comprising exposing the radial bearing rotor to the outside environment.

23. The electric machine of claim 1, wherein the seal is a first seal, the electric machine further comprising a second seal connected to the first seal by a butt joint.

24. An electric machine comprising:
   a first electric rotor;
   a first electric stator surrounding the first electric rotor, the first electric rotor being configured to drive or be driven by the first electric stator, the first electric stator comprising a first set of electric multi-phase windings defining multiple electrical phases;
   a second electric rotor rotatably configured to rotate in unison with the first electric rotor;
   a second electric stator surrounding the second electric rotor, the second electric stator comprising a second set of electric multi-phase windings defining multiple electrical phases, the second electric stator being electrically coupled to the first electric stator, the second electric rotor being configured to drive or be driven by the second electric stator; and
   a controller electrically coupled to both the first electric stator and the second electric stator, the controller configured to exchange an electric current with a combination of the first electric stator and the second electric stator, and
   wherein the first electric stator and the second electric stator comprise a seal configured to isolate either the first electric stator or the second electric stator from an outside, downhole environment, and
   wherein an inner surface of the seal and an outer surface of the first electric rotor and the second electric rotor define an annulus exposed to the outside environment.

25. The electric machine of claim 24, wherein the controller comprises a variable speed drive or a variable speed rectification system.

26. The electric machine of claim 24, wherein the first electric rotor and the second electric rotor comprise permanent magnets rotors.

27. The electric machine of claim 26, wherein the first electric rotor and the second electric rotor are configured so that a magnetic field of the first electric rotor is configured to be angularly out of phase with a magnetic field of the second electric rotor.

28. The electric machine of claim 24, wherein the first electric stator and the first electric stator are angularly in-phase with one another during operation.

29. The electric machine of claim 24, wherein the electric machine is a downhole-type electric machine.

30. The electric machine of claim 24, wherein the electric machine is a three-phase electric machine.

* * * * *